United States Patent
Shoemaker, Jr.

(10) Patent No.: US 12,082,572 B1
(45) Date of Patent: *Sep. 10, 2024

(54) RAT TRAP WITH SPRING TENSIONED GAROTTE NOOSE

(71) Applicant: Stephen P. Shoemaker Trust, Manhattan Beach, CA (US)

(72) Inventor: Stephen P. Shoemaker, Jr., Redondo Beach, CA (US)

(*) Notice: Subject to any disclaimer, the term of this patent is extended or adjusted under 35 U.S.C. 154(b) by 9 days.

This patent is subject to a terminal disclaimer.

(21) Appl. No.: 18/383,857

(22) Filed: Oct. 25, 2023

Related U.S. Application Data

(62) Division of application No. 18/222,442, filed on Jul. 15, 2023.

(51) Int. Cl.
*A01M 23/34* (2006.01)

(52) U.S. Cl.
CPC .................................. *A01M 23/34* (2013.01)

(58) Field of Classification Search
CPC ..... A01M 23/24; A01M 23/34; A01M 23/245
USPC ....................................................... 43/85–87
See application file for complete search history.

(56) References Cited

U.S. PATENT DOCUMENTS

| | | | | |
|---|---|---|---|---|
| 817,601 A * | 4/1906 | Werd | ................... | A01M 23/34 43/87 |
| 858,986 A * | 7/1907 | Johansson | ............. | A01M 23/24 43/86 |
| 872,041 A * | 11/1907 | Marks et al. | ......... | A01M 23/24 43/86 |
| 895,017 A * | 8/1908 | Hooker | .................. | A01M 23/24 43/86 |
| 1,131,908 A * | 3/1915 | Claeson | ................ | A01M 23/24 43/86 |
| 1,323,400 A * | 12/1919 | Lokai | ..................... | A01M 23/34 43/87 |
| 2,224,474 A * | 12/1940 | Draggoo | ............... | A01M 23/34 43/87 |
| 2,348,002 A * | 5/1944 | Glass | .................... | A01M 23/34 43/86 |
| 2,458,176 A * | 1/1949 | Jones | .................... | A01M 23/34 43/87 |
| 2,478,025 A * | 8/1949 | Taylor | ................... | A01M 23/34 43/87 |
| 2,492,957 A * | 1/1950 | Blair | ..................... | A01M 23/24 43/120 |

(Continued)

FOREIGN PATENT DOCUMENTS

| CA | 1101209 A | * | 5/1981 | ............ A01M 23/24 |
| CA | 1225830 A | * | 8/1987 | ............ A01M 23/34 |

(Continued)

*Primary Examiner* — Darren W Ark
(74) *Attorney, Agent, or Firm* — Fulwider Patton LLP

(57) ABSTRACT

A rat trap includes a frame with a tunnel or arch at a first and, the tunnel formed with a slit over the entrance. A spring is mounted on the frame and a locking mechanism can temporarily maintain the spring in tension. A cable is attached to the spring and includes a noose at a distal end. With the noose disposed in the slit, a switch such as a mechanical switch or an electrical switch is arranged to detect the presence of a rat in the tunnel below the slit. The switch operates to release the spring and withdraw the noose from the tunnel at a high rate of speed to capture the animal in the tunnel.

3 Claims, 8 Drawing Sheets

(56) References Cited

U.S. PATENT DOCUMENTS

| | | | | | |
|---|---|---|---|---|---|
| 2,696,063 | A | * | 12/1954 | Hounsell | A01M 23/34 43/87 |
| 2,894,352 | A | * | 7/1959 | McDonald | A01M 23/34 43/87 |
| 4,306,370 | A | * | 12/1981 | Lindblad | A01M 23/24 43/82 |
| 4,471,560 | A | * | 9/1984 | Hughan | A01M 23/34 43/85 |
| 4,601,128 | A | * | 7/1986 | Danison | A01M 23/34 43/87 |
| 5,062,237 | A | * | 11/1991 | Kitagawa | A01M 23/34 43/87 |
| 7,171,777 | B2 | * | 2/2007 | Welin-Berger | A01M 23/24 43/87 |
| 7,543,407 | B2 | * | 6/2009 | McCulloch | A01M 23/245 43/85 |
| 9,781,917 | B1 | * | 10/2017 | Pribyl | A01M 23/00 |
| 10,021,873 | B2 | * | 7/2018 | Kimball | A01M 23/245 |
| 11,950,587 | B1 | * | 4/2024 | Shoemaker, Jr. | A01M 23/34 |
| 2009/0313879 | A1 | * | 12/2009 | Vasyl | A01M 23/34 43/87 |
| 2010/0275503 | A1 | * | 11/2010 | Ziegmann | A01M 23/245 43/85 |
| 2011/0289821 | A1 | * | 12/2011 | Bonnot | A01M 23/34 43/85 |
| 2014/0026466 | A1 | * | 1/2014 | Ziegmann | A01M 23/34 43/92 |
| 2014/0223801 | A1 | * | 8/2014 | McBride | A01M 23/34 43/87 |
| 2014/0259874 | A1 | * | 9/2014 | Kimball | A01M 23/24 43/85 |
| 2015/0272107 | A1 | * | 10/2015 | Henry | A01M 23/245 43/81 |
| 2018/0317475 | A1 | * | 11/2018 | Redmayne | A01M 31/008 |
| 2021/0076663 | A1 | * | 3/2021 | Chisholm | A01M 23/30 |

FOREIGN PATENT DOCUMENTS

| | | | | |
|---|---|---|---|---|
| CA | 2086774 | A1 | * | 7/1994 |
| CA | 2894093 | A1 | * | 12/2016 | A01M 23/34 |
| DE | 511605 | C | * | 10/1930 |
| DE | 663009 | C | * | 7/1938 |
| DE | 2912050 | A1 | | 10/1979 |
| DE | 9309382 | U1 | * | 11/1993 |
| DE | 9316948 | U1 | * | 3/1994 |
| FR | 945122 | A | * | 4/1949 |
| GB | 2300557 | A | * | 11/1996 | A01M 23/34 |
| WO | WO-0176363 | A1 | * | 10/2001 | A01M 23/34 |
| WO | WO-0215686 | A1 | * | 2/2002 | A01M 23/16 |
| WO | WO-2017078546 | A1 | * | 5/2017 | A01M 23/24 |

* cited by examiner

RAT TRAP WITH SPRING TENSIONED GAROTTE NOOSE

CROSS-REFERENCES TO RELATED APPLICATIONS

This is a DIVISIONAL based on U.S. Ser. No. 18/222,442; filed on Jul. 15, 2023, the contents of which is incorporated by reference herein in its entirety.

BACKGROUND

It has been said that if you build a better rat trap, the world will beat a path to your door. Maybe because of this, many have tried to improve on the traditional rat trap device. The problem with many rat traps is that they are unreliable and prone to allowing the rat to escape. Once caught, there is often a messy cleanup and it can be difficult to remove the animal and reset the trap, especially if the rat is still alive. What is needed is a rat trap that is clean, efficient, reliable, and versatile. The present invention addresses these needs.

SUMMARY OF THE INVENTION

The present invention is a rat trap comprising a frame that houses a quantity of bait that can be used to entice a rat inside. Note: although the term "rat" is used for simplicity, it is to be understood that other animals of various sizes can be captured with the present invention and it is not limited to any particular animal or vermin. Attached to the frame is a spring loaded cable that includes a noose at the opposite end. The noose is fed through a slot in the frame such that the rat must pass through the noose to reach the bait. The spring loaded noose is triggered by a sensor or switch adjacent the bait such that the presence of the rat releases the noose. The sensor can be a pressure sensor, an optical sensor, a motion sensor, or any other type of sensor. When the sensor senses that the rat is in the noose, the sensor releases the spring loaded noose, causing the rat to be captured inside the noose against the frame. The tension of the spring can be adjusted so that the noose can either capture or kill the rat. If captured, the rat can be removed and released outside.

These and other features of the invention will best be understood with reference to the accompanying drawings and the detailed description of the invention below.

DETAILED DESCRIPTION OF THE PREFERRED EMBODIMENTS

Figure 1:
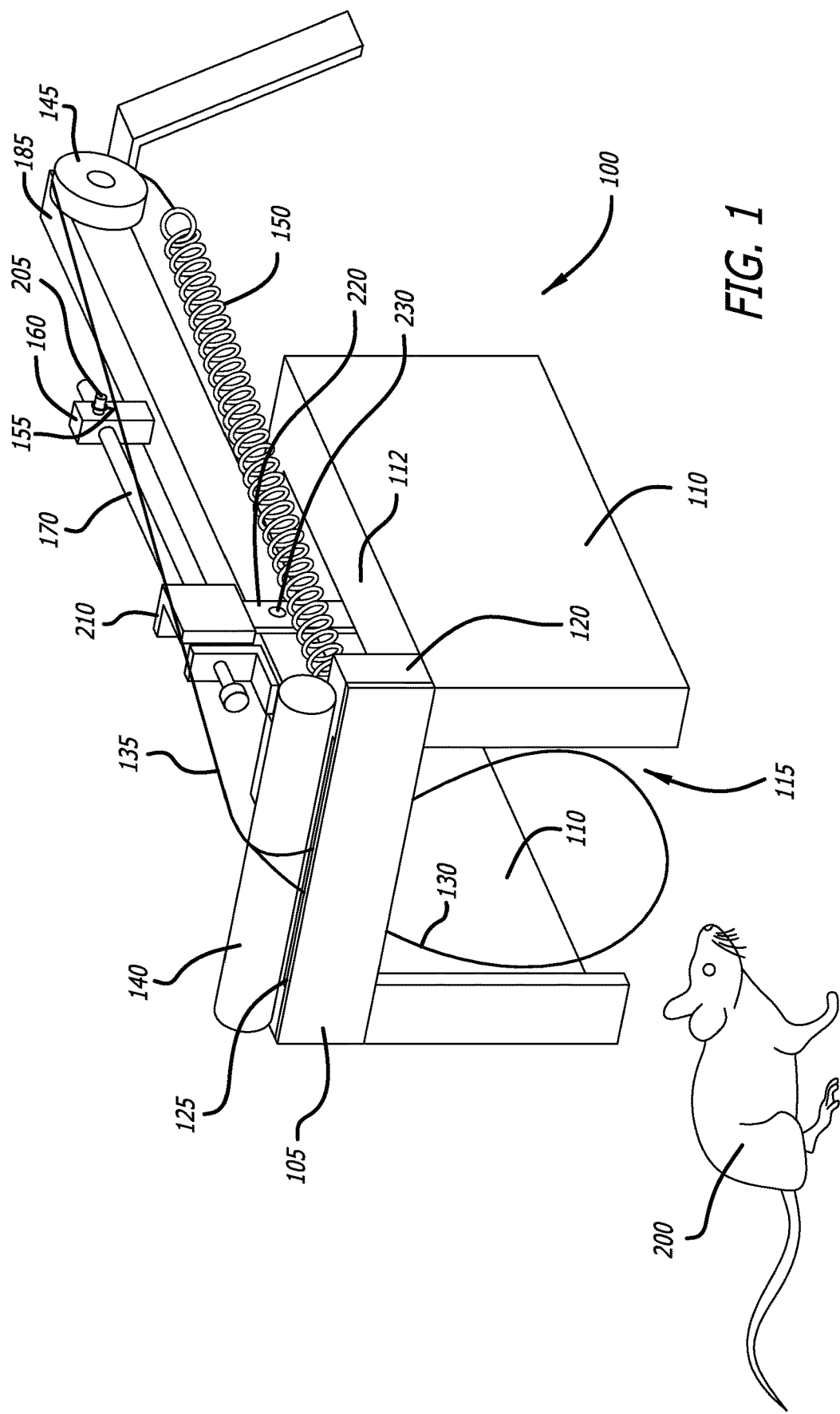
FIG. 1 is an elevated, perspective view of a first preferred embodiment of the present invention.

FIG. 1 illustrates a rat trap of the present invention. The trap 100 comprises a frame 105 preferably made of steel, aluminum, or other sturdy material. The frame 105 includes first and second walls 110 and a cover 112 that form an arch or tunnel 115 that serves as a pathway for a rat 200 to enter the trap 100. An entrance to the tunnel 115 includes a beam 120 connecting the first and second walls 110, with the walls and the beam 120 establishing the "garotte" portion of the trap 100. The beam 120 includes a slot 125 that receives the noose end 130 of a wire or cable 135 after the cable 135 preferably passes over a pulley or cylinder 140. The cable 135 at an opposite end may extend around another pulley 145 before connecting to a large spring 150 that is connected to the frame. The cable 135 also may include a catch 155 such as a ring/loop/hook that can attach to a column 160 to keep the spring in tension. The column 160 includes a downwardly oriented post 180 (see FIG. 3) that passes through a central beam 185 on the frame 105 and allows the column 160 to rotate freely about a vertical axis aligned with the post 180. The column also includes a peg 205 that cooperates with the ring/loop/hook to keep the spring loaded and in tension when the orientation of the column is such that the peg protrudes perpendicular to the cable 135. This orientation of the column 160 is set by rod 170 passing through the column. The rod extends to and bears against a plate 210. The rotation of the column 160 is therefore prevented by the rod's position against the plate 210.

With the column fixed by the rod, the cable's catch 155 can be secured to the column 160 as shown in FIG. 1 and the tension in the spring 150 is kept by the engagement of the catch with the peg 205. Although the spring is stretched and the tension is high, the noose is slack because the engagement of the catch with the column.

Figure 2:
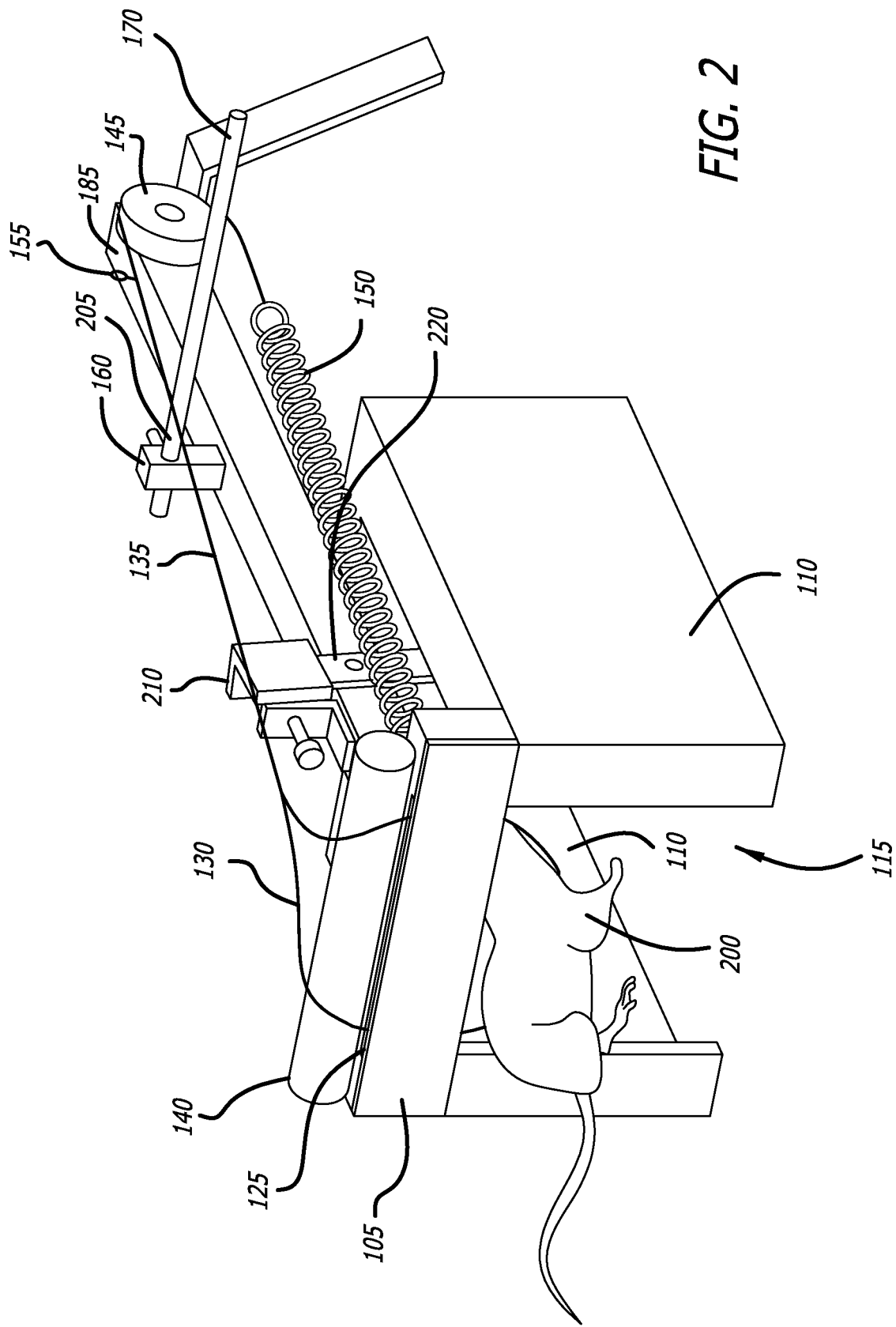
FIG. 2 is an elevated, perspective view of the trap capturing a rat.

When the rat 200 enters the tunnel 115 to get the bait, the rat moves the pendulum 220, which in turn rocks the plate 210 in the opposite direction due to a pivot pin 230. When the plate 210 rocks away from the rod 170, the rod disengages with the plate 210. The spring 150 pulls the peg 205 and rotates the column 160, which in turn rotates the peg 205 such that it releases the catch 155. With the catch no longer attached to the column, the cable is free and withdraws violently under the force of the spring 150. This pulls the noose 130 upward and through the slot 125, capturing the rat 200 (see FIG. 2).

Figure 3:
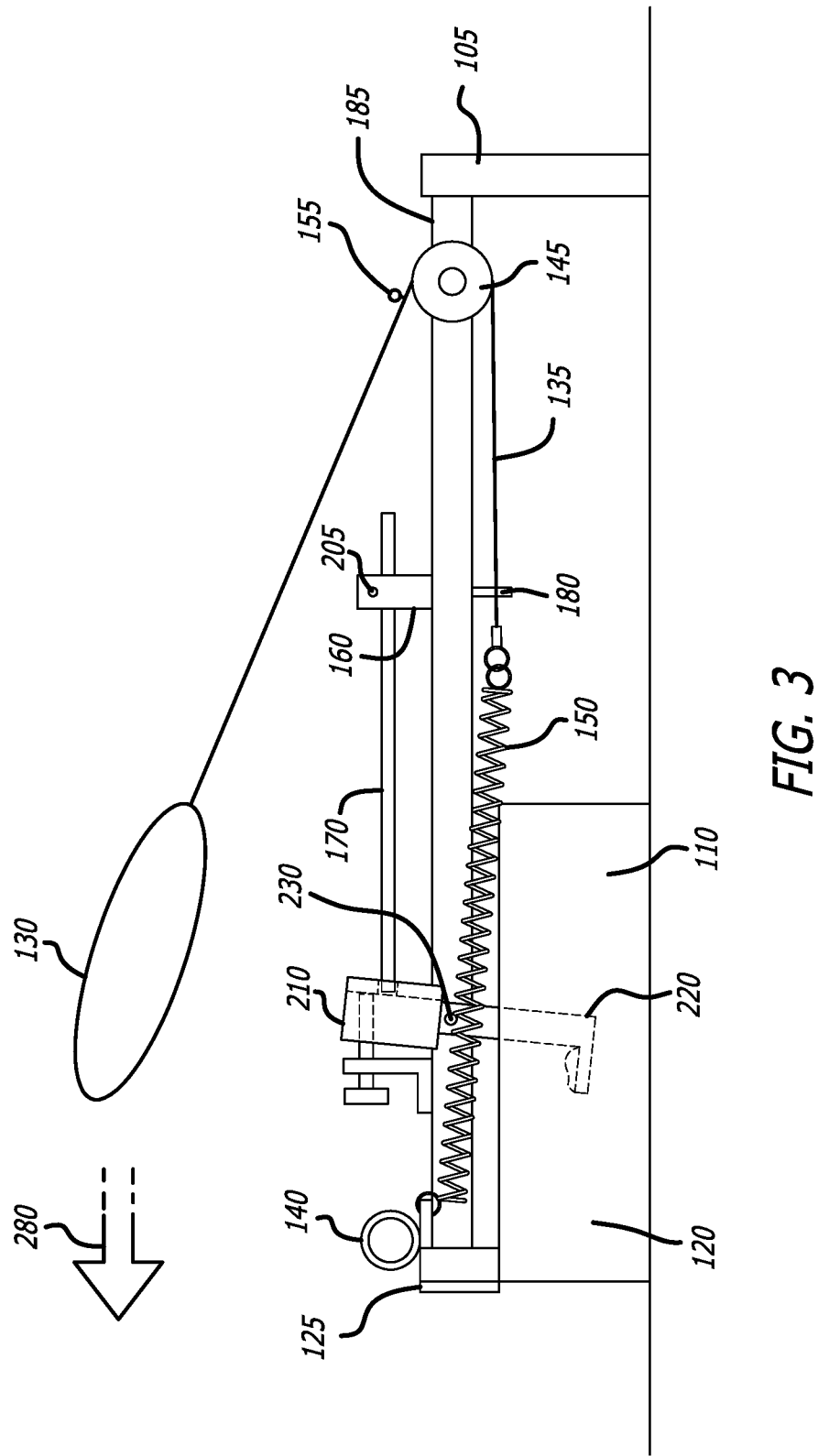
FIGS. 3-7 are side views, partially in phantom, of the embodiment of FIG. 1 showing the loading and capture of a rat.
Figure 4:
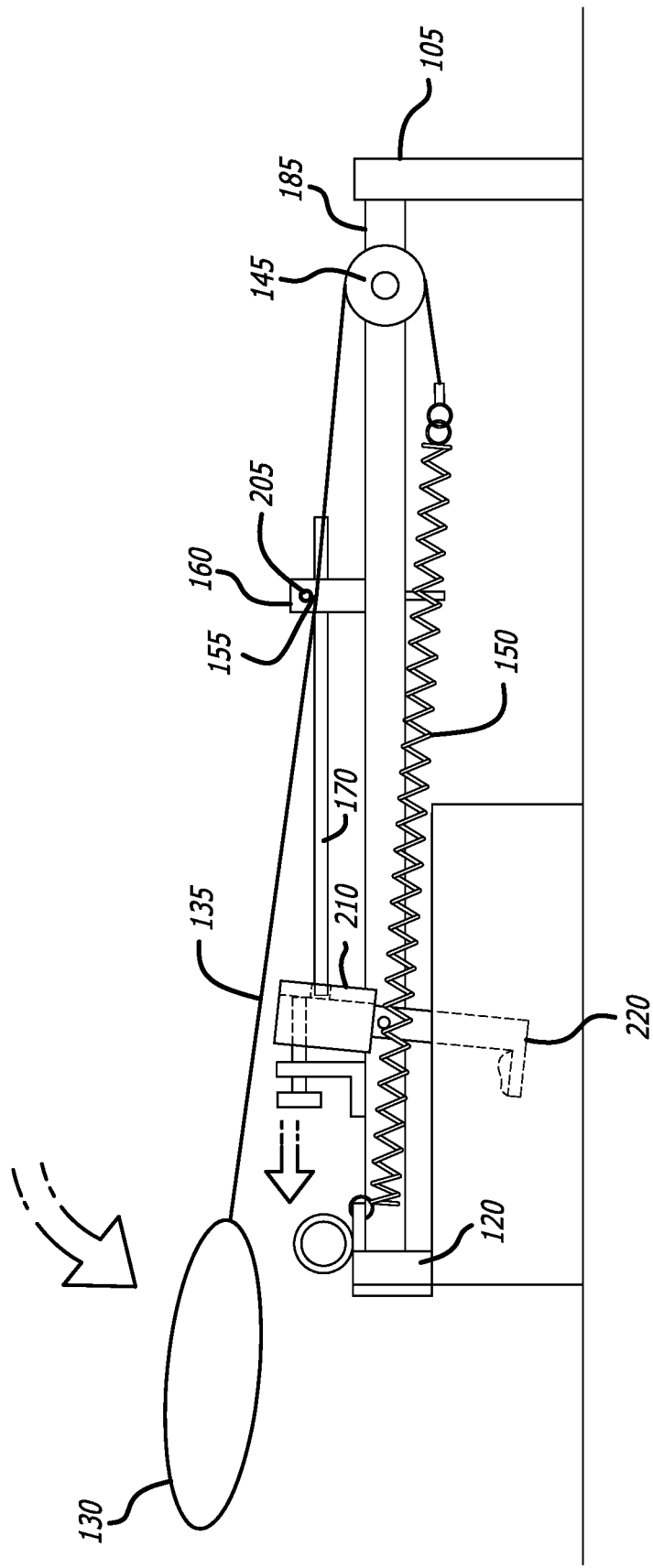

FIGS. 3 and 4 show how the trap 100 is loaded. FIG. 3 shows the cable 135 disconnected with the column 160 so the spring 150 is contracted and the noose 130 is outside of the housing or tunnel. The noose is pulled in the direction of arrow 280 so that the cable 135 is pulled tight and begins to stretch the spring 150. When the noose 130 is pulled far enough, the catch 155 is connected to the peg 205 to set the trap 100. The noose 130 is pulled over the cylinder 140 and slipped into the slot 125. The column 160 cannot rotate freely because of the engagement of the rod 170 against the plate 210. The position of the plate 210 is determined by the location of the pendulum 220, which bears the bait for the trap.

Figure 5:
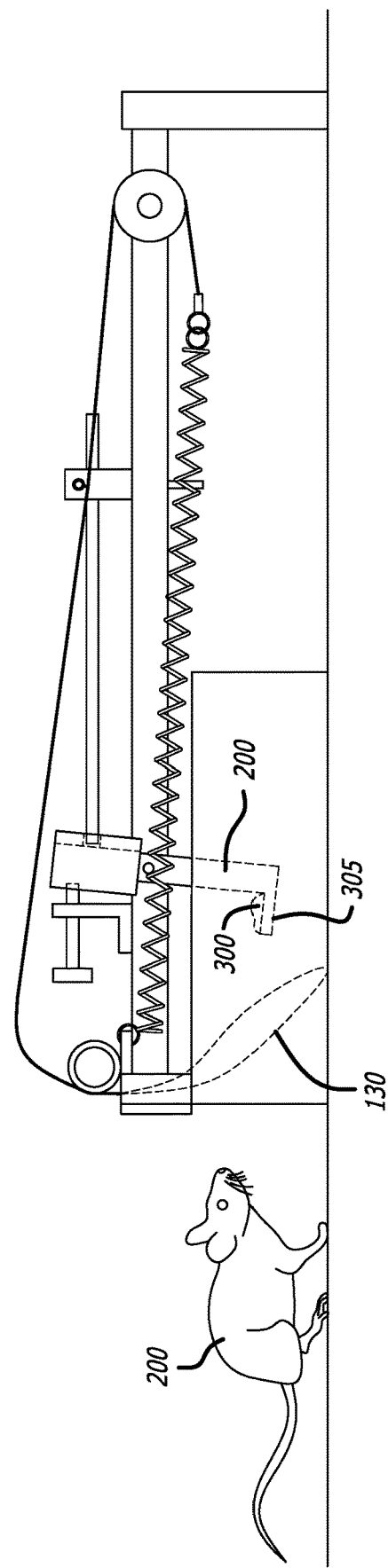
Figure 6:
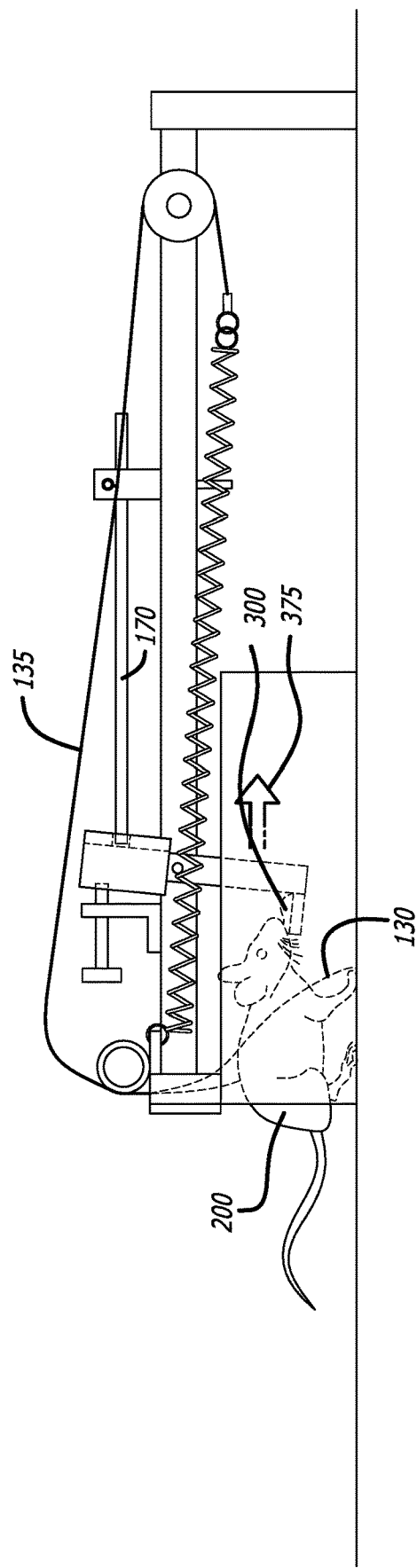
Figure 7:
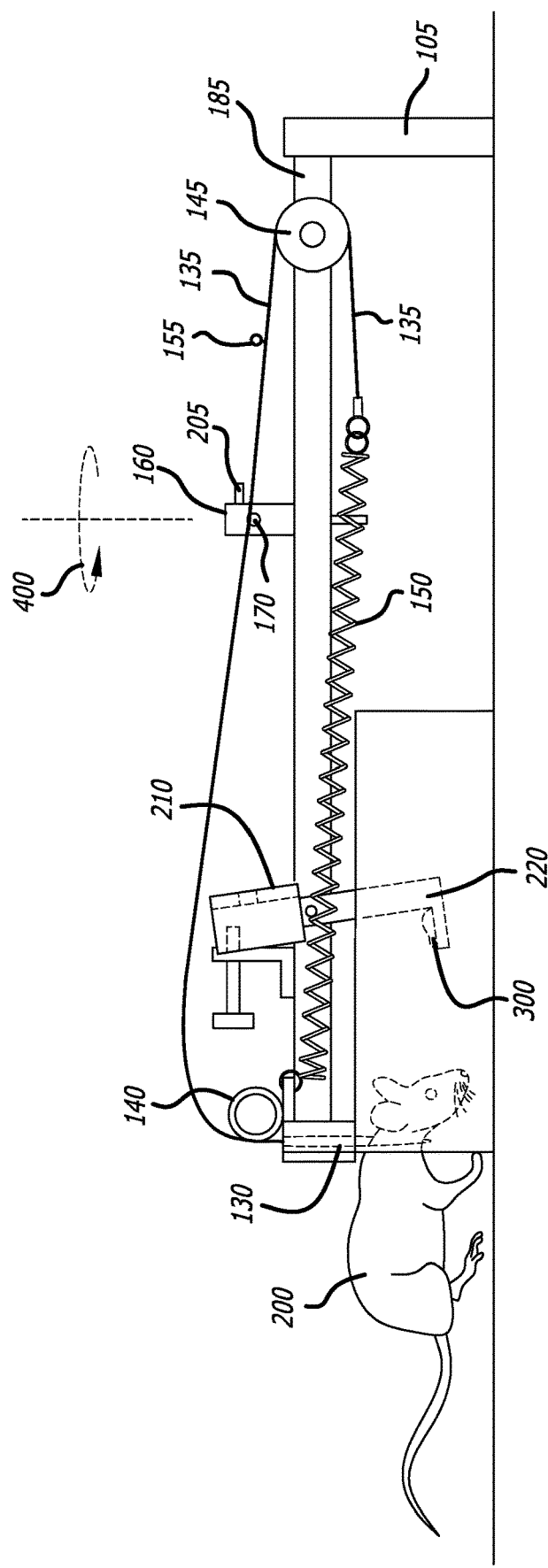

FIG. 5 shows the rat entering the trap 100. The bait 300 can be on a short ledge 305 of the pendulum 220, or behind the pendulum, so that the rat can move the pendulum to get to the bait. In FIG. 6, the rat moves the pendulum 220 in the direction of arrow 375 in an attempt to get or eat the bait 300. To reach the bait, the rat steps over the noose 130. In FIG. 7, the movement of the pendulum 220 by the rat has moved plate 210 slightly, releasing the rod from its engagement with the plate 210. With the rod 170 free to rotate, the column 160 rotates in the direction of arrow 400 and the peg rotates such that it points toward the end of the trap, thereby releasing the catch 155. The release of the catch 155 disengages the cable 135 with the frame and the spring retracts the noose 130 back through the slot 125, capturing the rat 200.

Figure 8:
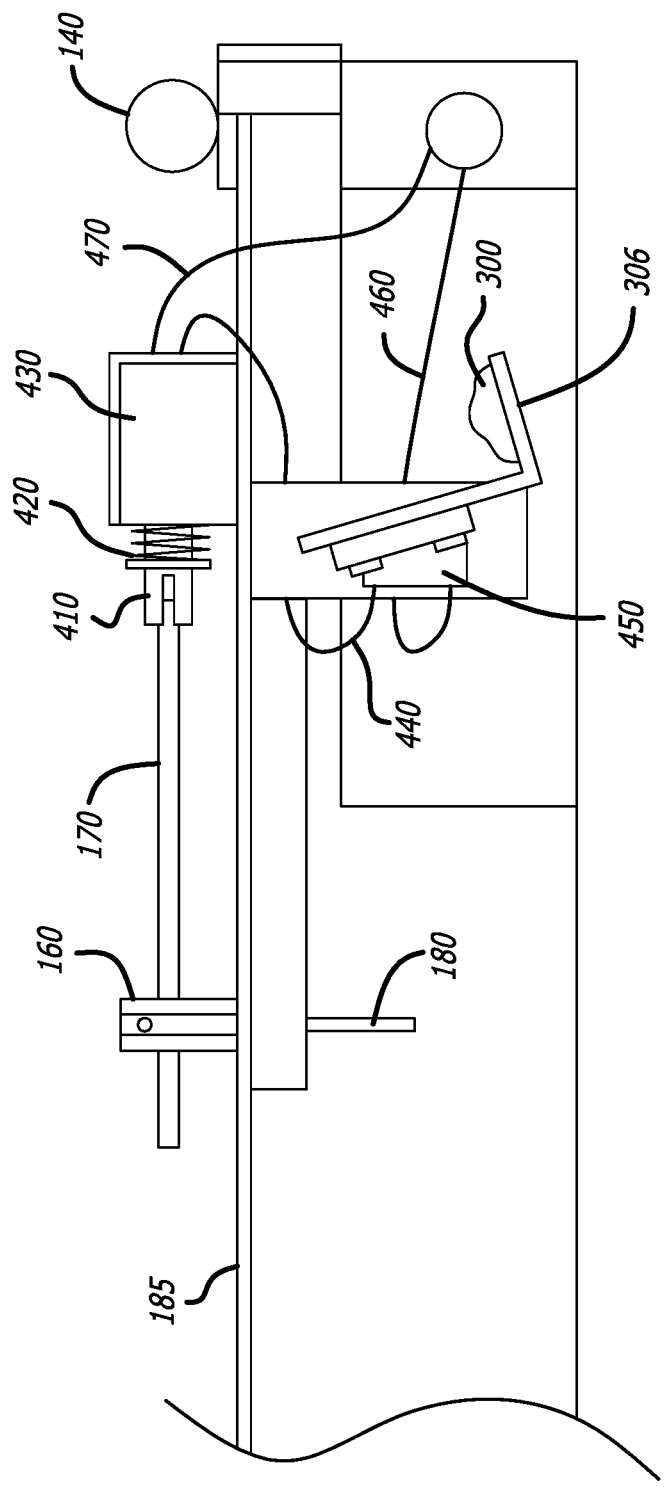
FIG. 8 is a side view of an alternate embodiment of the present invention.

In FIG. 8, the mechanical switch of the previous embodiment has been replaced with an electronic switch. The operation of the trap is the same, but instead of a pendulum the bait 300 is located on an "L" shaped element 306 that pivots. The rod 170 is captured in a piston 410 within a cavity at a distal end. A spring 420 biases the piston 410 toward the column 160 so that the rod 170 can engage the piston and lock the trap as with the previous embodiment. The piston is coupled to a solenoid 430 that is connected via a wire 440 to an electrical switch 450. The switch is ground to the frame 105 via wire 460, as is the solenoid via wire 470. When the rat approaches the bait 300, the "L" shaped element rocks back, causing contact with the electrical switch 450 to close the circuit, and actuate the solenoid 430. The solenoid then withdraws the piston 410 against the bias of the spring 420, until the rod 170 is released from engagement with the end of the piston. With the rod released, the column 160 can rotate to free the cable from the catch and spring the trap on the unsuspecting rat.

While the foregoing describes some of the inventor's preferred embodiments, the invention is not intended to be limited by any specific embodiment described or depicted in the figures. For example, the size and shape of the animal determines the best trap, where the larger the animal the larger the trap and stronger the spring. Accordingly, the invention's scope is determined by the appended claims using their ordinary meanings consistent with the foregoing descriptions and depictions herein.

I claim:

1. A rat trap, comprising:
    a frame having a first end, a second end, and a central beam connecting the first end to the second end, the second end formed with a slot for receiving a cable;
    a tunnel disposed at the second end;
    a spring mounted to said frame and attached directly to the frame only at a first end of the spring and having a free end opposite the first end of the spring which is unattached to any portion of the frame, said spring having a longitudinal axis and a direction of travel along said longitudinal axis;
    a cable attached directly to the unattached free end of the spring, the cable including a noose at an end thereof, where the noose is inserted into the slot, the cable further including a ring connected thereto;
    a switch configured for detecting a presence of an object below the slot;
    a column rotatably connected to the central beam, the column configured to keep the cable in tension from the spring when the column is held in a first position by the switch until the switch releases the column to allow the column to rotate to a second position to release the tension on the cable from the spring;
    a peg extending from the column and sized to insert into said ring, wherein the peg is inserted into said ring when the column is in the first position to keep the cable in tension from the spring and wherein the peg is disengaged from the ring when the column rotates to the second position to release the tension on the cable from the spring; and
    a pulley vertically disposed on the frame at said first end of the frame, said pulley receiving the cable thereon for converting a linear movement of the free end of the spring in a first direction to a linear movement of the cable in an opposite direction to the first direction;
    whereupon the object is captured inside the noose of the cable as the cable is withdrawn from the slot.

2. The rat trap of claim 1, wherein the cable is a monofilament wire.

3. The rat trap of claim 1, wherein the second end of the frame includes a horizontal cylinder adjacent the slot for redirecting a movement of the noose to a vertical direction.

* * * * *